Feb. 8, 1944.  E. C. CLARK ET AL  2,341,208
REARVIEW MIRROR
Filed Nov. 12, 1942
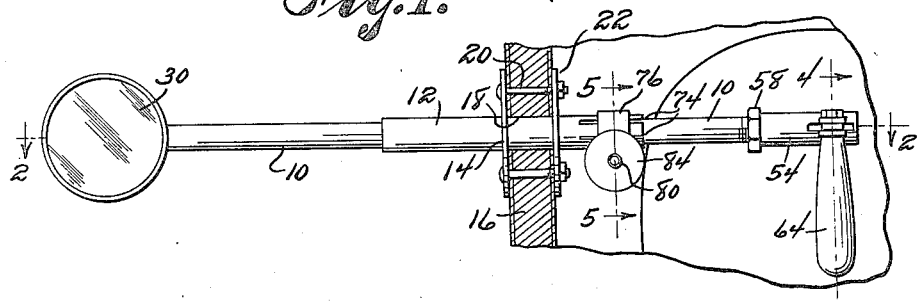
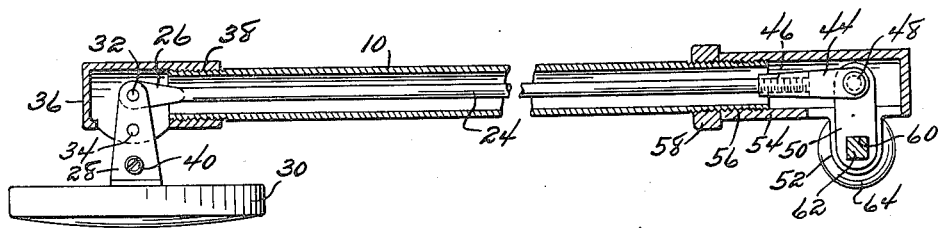
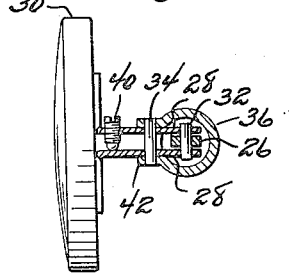
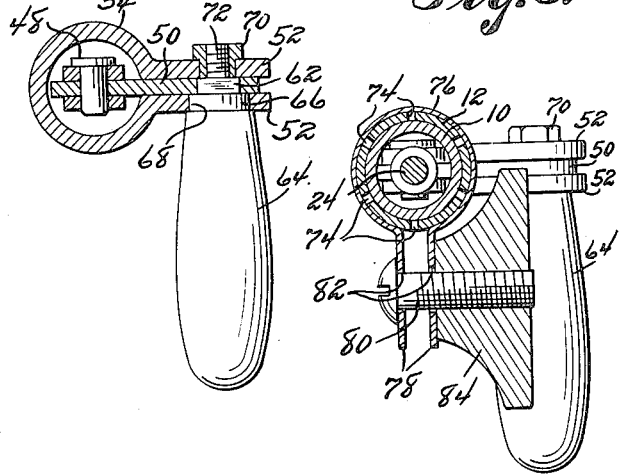
Elvin C. Clark
Harold J. Clark INVENTORS
BY
Victor J. Evans & Co.
ATTORNEYS Patented Feb. 8, 1944

2,341,208

UNITED STATES PATENT OFFICE 2,341,208

REARVIEW MIRROR

Elvin C. Clark and Harold J. Clark, Montour, Iowa

Application November 12, 1942, Serial No. 465,379

4 Claims. (Cl. 88—93)

Our invention relates to automotive vehicles and has among its objects and advantages the provision of an improved rear view mirror embodying novel means whereby the mirror may be adjusted about horizontal and vertical axes and in which the mirror comprises relatively few parts and is so designed as to facilitate manufacture at a low cost.

In the accompanying drawing:

Figure 1 is a face view of the mirror and its supporting and adjusting means.

Figure 2 is a sectional view along the line 2—2 of Figure 1.

Figure 3 is a sectional end view of the mirror supporting shaft.

Figure 4 is an enlarged sectional view along the line 4—4 of Figure 1, and

Figure 5 is a sectional view along the line 5—5 of Figure 1.

In the embodiment of the invention selected for illustration, we make use of a tubular mirror supporting shaft 10 extending through a horizontal tube or friction sleeve 12. The sleeve 12 is provided with a fixed flange 14 engaging one face of the vehicle body or supporting structure 16. An opening 18 is provided in the support 16 for reception of the sleeve 12, and the sleeve is fixedly related to the support by bolts 20 extending through the flange 14, the support 16 and a plate 22 lying against the opposite face of the support 16.

Inside the tube 10 is arranged a rod 24 having a flat end 26 lying between fingers 28 attached to the mirror 30. A pin 32 pivotally connects the end 26 with the fingers 28, and the fingers are pivotally connected at 34 with a cap 36 having a screw threaded connection 38 with one end of the tube 10. Thus longitudinal movement of the rod 24 imparts pivotal movement to the mirror 30. An adjusting screw 40 is threaded through one of the fingers 28 and engages the other finger 28 to bring the two fingers into frictional engagement with the flanges 42 on the cap 36.

A clevis 44 is threadedly connected with the opposite end of the rod 24, as at 46, which clevis is pivotally connected at 48 with an arm 50 which may be oscillated for imparting longitudinal movement to the rod 24.

The arm 50 fits loosely between two spaced fingers 52 on a cap 54 threadedly connected at 56 with the tube 10. This end of the tube extends inside the vehicle. A jam nut 58 is threaded on the tube 10 and engages the cap 54 to secure the latter against accidental rotation relatively to the tube 10.

A square opening 60 is provided in the arm 50 for the reception of a square shaft 62 fixed to a handle 64. This handle includes a short shaft 66 rotatably mounted in an opening 68 in one of the fingers 52. A nut 70 is threadedly connected with a pin 72 coaxial with the square shaft 62 to hold the handle 64 in assembled relationship with the two fingers and with the arm 50. Thus the handle 64 may be rotated about its longitudinal axis for imparting longitudinal movement to the rod 24 and pivoting the mirror 30 about a generally vertical axis.

The end of the sleeve 12 inside the vehicle is slotted at 74, and a band 76 encircles the slotted portion of the sleeve. This band includes extensions 78 through which a bolt 80 passes loosely, as through openings 82. A knob 84 is threadedly connected with the screw 80 and engages one of the extensions 78 so that the band 76 may be clamped firmly about the slotted portion of the sleeve to frictionally relate the sleeve and the tube 10. However, the tube 10 may be rotated relatively to the sleeve 12 through oscillatory motion of the handle 64. This permits the mirror 30 to be adjusted about a horizontal axis, so that the mirror may be accurately adjusted under variable road conditions from a position inside the vehicle.

Without further elaboration, the foregoing will so fully explain our invention, that others may, by applying current knowledge, readily adapt the same for use under various conditions of service.

We claim:

1. A rear view mirror for automotive vehicles comprising a tubular shaft, means supporting the shaft for rotation about its axis, a mirror pivoted to the shaft, a handle, means supporting the handle on the shaft for rotation about an axis offset laterally from and transversely related to the shaft, said means holding the handle against swinging movement with relation to the shaft so as to permit the shaft to be turned by the handle about its axis, and an operating connection between the handle and mirror to permit the mirror to be turned about its pivot through rotation of the handle.

2. A rear view mirror for automotive vehicles comprising a supporting sleeve having a slotted portion, a tubular shaft supported in the sleeve for relative rotation therein, a band encircling the slotted portion of the sleeve for frictionally constricting the sleeve upon the shaft, a mirror member having a pivotal connection with said shaft, a handle rotatably connected with said shaft, and an operating connection between said handle and said mirror member to pivot the latter about the axis of said pivotal connection through rotation of the handle, said handle being positioned at an angle to said shaft to rotate the shaft relatively to the sleeve through oscillation of the handle for adjusting the mirror member in planes paralleling the axis of said pivotal connection.

3. A rear view mirror for automotive vehicles comprising a supporting sleeve, a tubular shaft frictionally supported in the sleeve for relative rotation therein, a mirror member, finger means fixed to said mirror member and pivoted to said shaft, a handle rotatably connected with said shaft, a rod having one end pivotally connected with said finger means and lying inside said shaft, and an arm fixed to said handle and pivoted to the other end of said rod, said handle being positioned at an angle to said shaft to rotate the shaft relatively to the sleeve through oscillation of the handle for adjusting the mirror member in planes paralleling the axis of said pivotal connection of said mirror member to the shaft.

4. A rear view mirror for automotive vehicles comprising a sleeve, a support for said sleeve having an opening receiving the sleeve, a flange fixed to the sleeve engaging one face of said support, a plate mounted loosely on said sleeve in contact with the opposite face of said support, bolt means acting on the flange and plate and extending through the support for fixedly connecting the sleeve to the support, a tubular shaft frictionally supported in the sleeve for relative rotation therein, a mirror member having a pivotal connection with said shaft, a handle rotatably connected with said shaft, and an operating connection between said handle and said mirror member to pivot the latter about the axis of said pivotal connection through rotation of the handle, said handle being positioned at an angle to said shaft to rotate the shaft relatively to the sleeve through oscillation of the handle for adjusting the mirror member in planes paralleling the axis of said pivotal connection.

ELVIN C. CLARK.
HAROLD J. CLARK.